United States Patent
Sato et al.

(10) Patent No.: US 9,601,778 B2
(45) Date of Patent: Mar. 21, 2017

(54) ELECTRODE ACTIVE MATERIAL, ELECTRODE AND SECONDARY BATTERY

(71) Applicants: MURATA MANUFACTURING CO., LTD., Nagaokakyo-shi, Kyoto-fu (JP); Honda Giken Kogyo Kabushiki Kaisha, Minato-ku, Tokyo (JP)

(72) Inventors: Masaharu Sato, Nagaokakyo (JP); Tomoaki Onoue, Nagaokakyo (JP); Hidehisa Mokudai, Wako (JP); Toru Sukigara, Wako (JP)

(73) Assignees: MURATA MANUFACTURING CO., LTD., Nagaokakyo-Shi, Kyoto-Fu (JP); HONDA GIKEN KOGYO KABUSHIKI KAISHA, Minato-Ku, Tokyo (JP)

( * ) Notice: Subject to any disclaimer, the term of this patent is extended or adjusted under 35 U.S.C. 154(b) by 287 days.

(21) Appl. No.: 14/279,381

(22) Filed: May 16, 2014

(65) Prior Publication Data

US 2014/0248535 A1 Sep. 4, 2014

Related U.S. Application Data

(63) Continuation of application No. PCT/JP2012/078694, filed on Nov. 6, 2012.

(30) Foreign Application Priority Data

Nov. 16, 2011 (JP) ................................. 2011-250629

(51) Int. Cl.

| | |
|---|---|
| H01M 4/58 | (2010.01) |
| H01M 4/62 | (2006.01) |
| H01M 4/60 | (2006.01) |
| H01M 4/36 | (2006.01) |
| H01M 4/137 | (2010.01) |
| H01M 10/052 | (2010.01) |

(52) U.S. Cl.
CPC ........... *H01M 4/625* (2013.01); *H01M 4/364* (2013.01); *H01M 4/60* (2013.01); *H01M 4/602* (2013.01); *H01M 4/137* (2013.01); *H01M 10/052* (2013.01)

(58) Field of Classification Search
CPC ........ H01M 4/625; H01M 4/364; H01M 4/60; H01M 4/602; H01M 4/137; H01M 10/052
See application file for complete search history.

(56) References Cited

U.S. PATENT DOCUMENTS

| | | | |
|---|---|---|---|
| 4,833,048 A | 5/1989 | DeJohnge et al. | |
| 2001/0044051 A1* | 11/2001 | Hamamoto | H01M 4/587 429/332 |
| 2013/0344385 A1 | 12/2013 | Onoue et al. | |

FOREIGN PATENT DOCUMENTS

| | | | |
|---|---|---|---|
| JP | 2004-207249 | 7/2004 | |
| JP | 2008-147015 | * 6/2008 | ............. H01M 4/60 |
| JP | 2008-147015 A | 6/2008 | |
| JP | 2008-222559 | 9/2008 | |
| JP | 2010-212152 A | 9/2010 | |
| JP | 2011-124017 A | 6/2011 | |
| JP | 2012-164480 A | 8/2012 | |
| WO | WO-2012-046527 A1 | 4/2012 | |
| WO | WO-2012-105439 A1 | 8/2012 | |
| WO | WO-2012-117941 A1 | 9/2012 | |

OTHER PUBLICATIONS

PCT/JP2012/078694 ISR dated Dec. 25, 2012.

* cited by examiner

*Primary Examiner* — Raymond Alejandro
(74) *Attorney, Agent, or Firm* — Arent Fox LLP

(57) ABSTRACT

An electrode active material has, as a main component, a mixture of an organic compound containing a rubeanic acid and cyanomethanesulfonylamide. The rubeanic acid is represented by the following general formula:

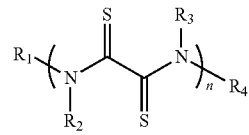

In the formula, n indicates an integer between 1 and 20, and $R_1$-$R_4$ indicate hydrogen atoms, halogen atoms, or a prescribed substituent group such as a hydroxide group, a 1-3C alkyl group, an amino group, a phenyl group, a cyclohexyl group, or a sulfo group.

20 Claims, 1 Drawing Sheet

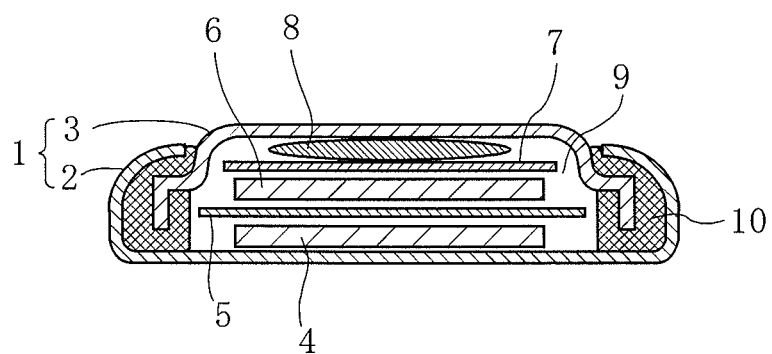

ELECTRODE ACTIVE MATERIAL, ELECTRODE AND SECONDARY BATTERY

CROSS REFERENCE TO RELATED APPLICATIONS

This application is a continuation application of international patent application Serial No. PCT/JP2012/078694 filed 6 Nov. 2012, which published as PCT Publication No. WO2013/073413 on 23 May 2013, which claims benefit of Japan patent application No. 2011-250629 filed 16 Nov. 2011, the entire content of which are incorporated herein by reference.

FIELD OF THE INVENTION

The present invention relates to an electrode active material, an electrode and a secondary battery, and more particularly relates to an electrode active material undergoing repeated charging and discharging by using an electrode reaction in the battery, and an electrode and a secondary battery respectively using the electrode active material.

BACKGROUND OF THE INVENTION

With the market expansion of mobile electronic devices such as cellular phones, laptop personal computers and digital cameras, a long-life secondary battery having high energy density able to have a higher output is desired as a cordless power source of these electronic devices.

To respond to such requirements, secondary batteries which use alkali metal ions such as lithium ions as a charge carrier, and use an electrochemical reaction associated with giving and receiving of charges of the charge carrier, have been developed. Particularly, a lithium ion secondary battery has high energy density, and become widely available as a battery for automobile use.

An electrode active material of structural elements of the secondary battery is a substance directly contributing to electrode reactions of charging and discharging in the battery, and has a central role in the secondary battery. That is, the electrode reaction in the battery is a reaction which occurs associated with giving and receiving of electrons by applying a voltage to an electrode active material electrically connected to an electrode located in an electrolyte, and the electrode reaction progresses during charge and discharge of the battery. Accordingly, as described above, the electrode active material systemically has a central role in the secondary battery In the lithium ion secondary battery, a lithium-containing transition metal oxide is used as a positive electrode active material and a carbon material is used as a negative electrode active material, and charge and discharge is performed by using a lithium ion insertion and detachment reactions for these electrode active materials.

However, the lithium ion secondary battery has a problem that a charge-discharge rate is restricted since the movement of lithium ions in the positive electrode becomes rate-determining. That is, since the moving rate of lithium ions in the transition metal oxide of the positive electrode in the lithium ion secondary battery is slow as compared with the electrolyte or the negative electrode, the electrode reaction rate in the positive electrode becomes rate-determining to restrict a charge-discharge rate, and consequently there are limitations to an increase in output or shorten of charging time.

Thus, in recent years, secondary batteries using an organic radical compound, an organic sulfur compound or a quinone compound for the electrode active material are actively researched and developed in order to solve these problems.

For example, the document 1 is known as a prior art document in which the organic radical compound is used for an electrode active material.

The document 1 proposes an active material for a secondary battery which uses a nitroxyl radical compound, an oxyradical compound, and a nitrogen radical compound having a radical on a nitrogen atom.

The organic radical compound can increase the reaction site concentration because unpaired electrons to be reacted exist locally in radical atoms, and thereby, realization of a secondary battery having high capacity can be expected. Further, since radicals have a large reaction rate, it is considered that charging can be completed in a short time by charge and discharge with the use of an oxidation-reduction reaction of stable radicals.

Further, the document 1 describes Examples in which a nitroxyl radical having high stability as a radical is used, and for example, it is verified that when an electrode layer containing a nitronylnitroxide compound is used as a positive electrode, and a copper foil having lithium attached thereto is used as a negative electrode to prepare a secondary battery, and charge and discharge are repeated, charging and discharging can be performed over 10 cycles or more.

The documents 2 and 3 are known as a prior art documents in which the organic sulfur compound is used for an electrode active material.

The document 2 proposes a novel metal-sulfur type battery in which the organic sulfur compound as a positive electrode material has an S—S bond in a charged state, the S—S bond is cleaved during discharge of the positive electrode to form an organic sulfur metal salt having metal ions.

In the document 2, as the organic sulfur compound, a disulfide-based organic compound (hereinafter, referred to as a "disulfide compound") represented by the general formula (1') is used.

R indicates aliphatic organic groups or aromatic organic groups, and the aliphatic organic groups or the aromatic organic groups may be the same or different from each other.

In the disulfide compound, a two-electron reaction can occur, and an S—S bond of the compound is cleaved in a reduced state (discharged state), and thereby organic thiolate (R—S—) is formed. The organic thiolate forms an S—S bond in an oxidized state (charged state), and returns back to the disulfide compound indicated by the general formula (1'). That is, since the disulfide compound forms the S—S bond having small bond energy, a reversible oxidation-reduction reaction occurs with the use of bonding and cleavage by the reaction, and thereby charge and discharge can be performed.

The document 3 proposes an electrode for a battery which has a structural unit indicated by the following formula (2'):

and includes rubeanic acid or rubeanic acid polymer capable of being bonded with lithium ions.

The rubeanic acid or rubeanic acid polymer containing a dithione structure indicated by the general formula (2') is bonded with lithium ions during reduction, and releases the bonded lithium ions during oxidation. It is possible to perform charge and discharge by using such a reversible oxidation-reduction reaction of rubeanic acid or rubeanic acid polymer.

In the document 3, when the rubeanic acid is used for the positive electrode active material, a two-electron reaction can occur, and a secondary battery having a capacity density of 400 Ah/kg at normal temperature is obtained.

The document 4 is known as a prior art document in which the quinone compound is used for an electrode active material.

The document 4 proposes an electrode active material containing a specific phenanthrenequinone compound having two quinone groups at relative ortho positions.

The specific phenanthrenequinone described in the document 4 initiates a two-electron reaction peculiar to a quinone compound between moving carriers and can generate a reversible oxidation-reduction reaction. Moreover, the oligomerization or polymerization of the specific phenanthrenequinone compound achieves insolubility in an organic solvent without causing a decrease in the number of reaction electrons due to the repulsiveness between electrons. Further, the document 4 indicates that a phenanthrenequinone dimer exhibits two oxidation-reduction voltages (around 2.9 V and around 2.5 V), and that the first discharge capacity reaches 200 Ah/kg.

The document 1: JP No. 2004-207249 A (pars. [0025]-[0026])

The document 2: U.S. Pat. No. 4,833,048 (claim 1, fifth column lines 20-28)

The document 3: JP No. 2008-147015 A (claim 1, par. (0027), FIGS. 3 and 5)

The document 4: JP No. 2008-222559 A (claim 4, pars. [0029], [0030], FIGS. 1 and 3)

SUMMARY OF THE INVENTION

Although an organic radical compound such as a nitroxyl radical compound is used for an electrode active material in the document 1, the charge-discharge reaction is limited to a one-electron reaction involving only one electron. That is, in the case of the organic radical compound, when a multi-electron reaction involving two or more electrons occurs, radicals lack stability to cause decomposition or the like, and therefore radicals decay to lose the reversibility of a charge-discharge reaction. Accordingly, the charge-discharge reaction of the organic radical compounds such as the document 1 is feared to be limited to the one-electron reaction, and it is difficult to realize the multi-electron reaction which can be expected of a high capacity.

In the document 2, although a low molecular disulfide compound involving two electrons is used, since bonding with other molecules and cleavage are repeated in association with the charge-discharge reaction, the battery lacks stability and has a possibility that repeated charge and discharge causes a capacity to deteriorate.

In the document 3, although the two-electron reaction is initiated by using the rubeanic acid or rubeanic acid polymer containing a dithione structure, when a polymer compound such as a rubeanic acid polymer is used, intermolecular interaction within the rubeanic acid polymer is large to interfere with the movement of ions, and therefore a sufficient reaction rate cannot be achieved. For this reason, it takes much time for charging. Further, since the movement of ions is interfered as described above, a ratio of the active material which can be used effectively is small, and therefore it is difficult to realize a secondary battery having desired high output.

In the document 4, since the phenanthrenequinone compound having two quinone groups at relative ortho positions is used for the electrode active material, the synthesis of the condensed ring-based phenanthrenequinone compound is difficult and a capacity density is small, while stability is excellent.

As described above, it is difficult in the prior art to achieve the multi-electron reaction and the stability to charge-discharge cycles simultaneously even if organic compounds such as organic radical compounds, disulfide compounds and rubeanic acid are used for an electrode active material, and therefore, at present, it is not yet possible to realize a long-life electrode active material having adequately high energy density, high output, and excellent cycle characteristics.

The present invention has been made in view of such a situation, and it is an object of the invention to provide an electrode active material having high energy density, high output, and excellent cycle characteristics with small deterioration of capacity even in repeating charge and discharge, and an electrode and a secondary battery respectively using the electrode active material.

Conjugated dithione (—CS—CS—) in a rubeanic acid has good reactivity with cations such as $Li^+$.

Then, the present inventors have made studies concerning organic compounds having a rubeanic acid structure containing conjugated dithione in a structural unit, and consequently have found that charge and discharge reactions of organic compounds having the rubeanic acid structure can be stabilized by containing cyanomethanesulfonylamide to thereby obtain an electrode active material having excellent cycle characteristics.

The present invention has been made based on the above findings, and an electrode active material according to the present invention is an electrode active material which is used as an active material of a secondary battery, repeating charging and discharging by an electrode reaction in the battery, and has a feature of having, as the main component thereof, a mixture of an organic compound containing a rubeanic acid structure in the structural unit and cyanomethanesulfonylamide.

Further, in the electrode active material of the present invention, the organic compound is preferably indicated by the following general formula.

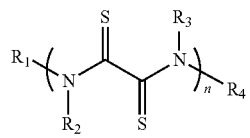

In the formula, n indicates an integer between 1 and 20, $R_1$-$R_4$ indicate at least any one selected from the group consisting of a hydrogen atom, a halogen atom, a hydroxyl group, a substituted or unsubstituted alkyl group having 1 to 3 carbon atoms, a substituted or unsubstituted amino group, a substituted or unsubstituted phenyl group, a substituted or unsubstituted cyclohexyl group, and a substituted or unsubstituted sulfo group, and $R_1$-$R_4$ may be the same and may be linked together to form a saturated or unsaturated ring.

In order to secure a more stable charge-discharge reaction, it is effective to contain the cyanomethanesulfonylamide in an amount of 0.1% by mass or more.

That is, in the electrode active material of the present invention, the content of the cyanomethanesulfonylamide in the mixture is preferably 0.1% by mass or more.

Further, an electrode according to the present invention has a feature of comprising the electrode active material according to any of the above electrode active materials and a conductive material.

Further, a secondary battery according to the present invention has a feature in that the electrode active material according to any of the above electrode active materials is contained in any one of a reaction starting material, a reaction product and an intermediate product in at least a discharge reaction of an electrode reaction in the battery.

Further, the secondary battery according to the present invention comprises a positive electrode, a negative electrode and an electrolyte, and has a feature in that the positive electrode comprises the electrode active material according to any of the above electrode active materials.

In accordance with the present invention, since the electrode active material is an electrode active material which is used as an active material of a secondary battery repeating charging and discharging by an electrode reaction in the battery, and has, as the main component thereof, a mixture of an organic compound containing a rubeanic acid structure in the structural unit and cyanomethanesulfonylamide, it is possible to obtain an electrode active material having a stable charge-discharge reaction and excellent cycle characteristics Furthermore, since conjugated dithione which is electrochemically active and rich in reactivity with cations such as $Li^+$ is contained in the rubeanic acid structure, charge-discharge efficiency is high and capacity density can be increased. As a result, an electrode active material with high energy density, in which stability during charging and discharging is improved, can be attained.

Further, in accordance with the present invention, since the electrode contains the electrode active material according to any of the above electrode active materials and a conductive material, it is possible to attain an electrode in which charge-discharge efficiency is high, charge can be performed in a short time, and an increase in output can be realized.

Moreover, in accordance with the secondary battery of the present invention, since the electrode active material according to any of the above electrode active materials is contained in any one of a reaction starting material, a reaction product and an intermediate product in at least a discharge reaction of an electrode reaction in the battery, it becomes possible to attain a long-life secondary battery which has high energy density, can be charged quickly and discharged at high output, has excellent cycle characteristics whereby there is small deterioration in capacity even in repeating charge and discharge, and has stable battery characteristics.

Furthermore, since the electrode active material has the above-mentioned organic compound as the main component, it is possible to attain a secondary battery in which an environmental burden is low and its safety is taken into consideration.

The above and other objects, features, and advantages of the invention will become more apparent from the following description.

BRIEF EXPLANATION OF THE DRAWING

The FIGURE is a sectional view showing an embodiment of a coin type battery as a secondary battery according to the present invention.

DETAILED DESCRIPTION OF THE INVENTION

Next, an embodiment of the present invention will be described in detail.

The electrode active material of the present invention has, as the main component thereof, a mixture of an organic compound containing a rubeanic acid structure in the structural unit and cyanomethanesulfonylamide. This makes it possible to provide an electrode active material having excellent cycle characteristics in which the charge-discharge reaction is stabilized.

The organic compound having a rubeanic acid in the structural unit thereof can be indicated by the following general formula (1).

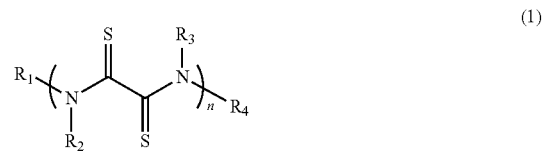

(1)

Herein, n indicates an integer between 1 and 20. $R_1$-$R_4$ indicate at least any one selected from the group consisting of a hydrogen atom, a halogen atom, a hydroxyl group, a substituted or unsubstituted alkyl group having 1 to 3 carbon atoms, a substituted or unsubstituted amino group, a substituted or unsubstituted phenyl group, a substituted or unsubstituted cyclohexyl group, and a substituted or unsubstituted sulfo group, and $R_1$-$R_4$ may be the same and may be linked together to form a saturated or unsaturated ring.

The electrode active material has, as the main component thereof, a mixture of an organic compound indicated by the above general formula (1), and cyanomethanesulfonylamide indicated by the following chemical formula (2).

(2)

By containing cyanomethanesulfonylamide in the electrode active material in addition to the organic compound containing a rubeanic acid structure in the structural unit, it becomes possible to improve the stability of the charge-discharge reaction. The reason is probably that cyanomethanesulfonylamide interacts with a reaction intermediate of the organic compound containing a rubeanic acid structure to stabilize the charge-discharge reaction.

Since conjugated dithione which is electrochemically active and rich in reactivity with cations such as $Li^+$ is contained in the rubeanic acid structure, charge-discharge efficiency is high and capacity density can be increased. As a result, an electrode active material with high energy density, in which stability during charging and discharging is improved, can be attained.

Although the content of the cyanomethanesulfonylamide in the electrode active material is not particularly limited, in case that the content is less than 0.1% by mass, there is a possibility that the charge-discharge reaction may not be adequately stabilized since the content of the cyanomethanesulfonylamide is too low. Accordingly, the content is preferably at least 0.1% by mass or more in order to effectively exert sufficient and desired stability during charge and discharge.

On the other hand, in case that the content of the cyanomethanesulfonylamide is more than 10% by mass, the content of the cyanomethanesulfonylamide is excessive, and therefore a molecular weight of the rubeanic acid structure portion which exerts the desired effect as an electrode active material is relatively reduced, and there is a possibility that the capacity density of the electrode active material may be lowered. Therefore, the content of the cyanomethanesulfonylamide is preferably 10% by mass or less.

A method of containing the cyanomethanesulfonylamide in the electrode active material is not particularly limited, and for example, a method in which cyanomethanesulfonylamide is separately prepared and is added directly to the organic compound described above may be employed. The content of the cyanomethanesulfonylamide in the electrode active material can be easily determined by subjecting the electrode active material or the electrode containing the electrode active material to mass spectrography by using an instrument such as a gas chromatograph mass spectrometer.

it is thought that the electrode active material produces a complex salt associated with the electrode reaction in the battery. The following reaction formula (A) shows an example of the charge-discharge reaction which is predicted when the organic compound indicated by the above general formula (1) is used for the electrode active material and Li is used for a cation of an electrolyte salt.

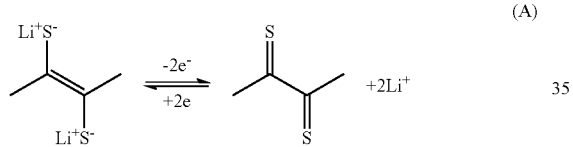

(A)

That is, in the electrode active material of the present invention, two electrons are involved in the reaction during charge and discharge, and the conjugated dithione portion contained in the rubeanic acid structure is bound to Li$^+$ during reduction and releases Li$^+$ during oxidation.

Examples of organic compounds falling within the category of the compounds indicated by the general formula (1) may include organic compounds indicated by the following chemical formulas (1a) to (1r).

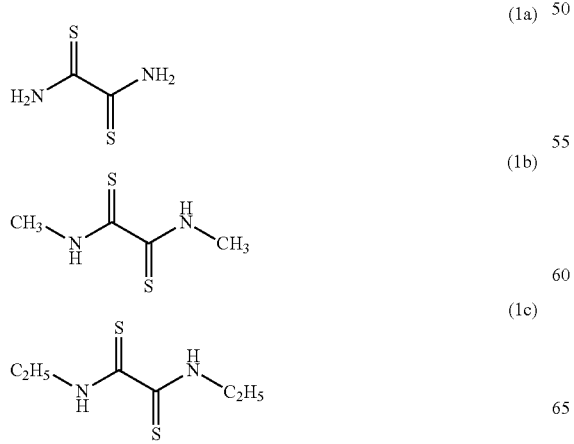

(1a)

(1b)

(1c)

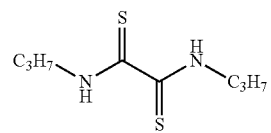

(1d)

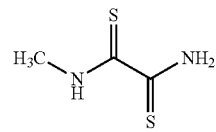

(1e)

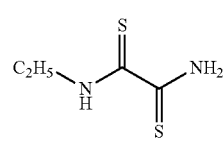

(1f)

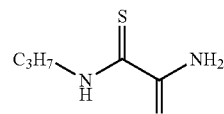

(1g)

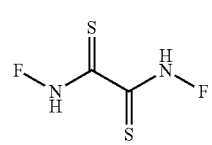

(1h)

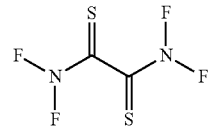

(1i)

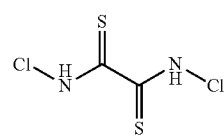

(1j)

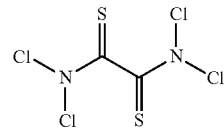

(1k)

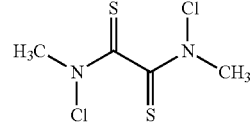

(1l)

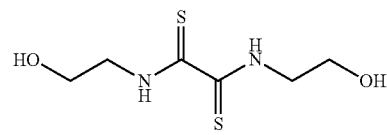

(1m)

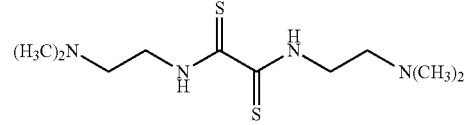

(1n)

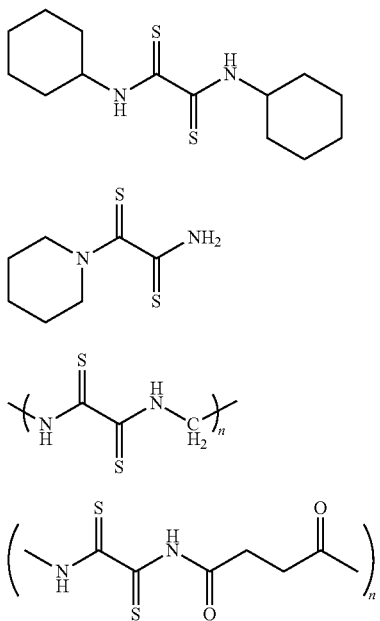

(1o)

(1p)

(1q)

(1r)

A molecular weight of the above-mentioned organic compound constituting the electrode active material is not particularly limited. However, the organic compound preferably has a molecular weight of a certain level or more since an excessively low molecular-weight organic compound may be easily dissolved in an electrolyte. On the other hand, the occurrence of the desired effect of the present invention depends on the conjugated dithione portion in the rubeanic acid structure, and therefore if a portion other than the conjugated dithione is large, a capacity capable of being stored per unit mass, or a capacity density, is small. Accordingly, with respect to the molecular weights of substituent groups $R_1$-$R_4$, the sum total of these molecular weights is preferably up to about 150.

In addition, when the organic compound is used as a polymer, the molecular weight and a molecular weight distribution are not particularly limited.

Next, a secondary battery using the electrode active material will be described in detail.

The FIGURE is a sectional view showing a coin type secondary battery as an embodiment of a secondary battery according to the present invention, and in the present embodiment, the electrode active material of the present invention is used for a positive electrode.

A battery case 1 has a positive electrode case 2 and a negative electrode case 3, and the positive electrode case 2 and the negative electrode case 3 are both formed into the shape of a disc-like thin plate. A positive electrode 4, which is obtained by forming a mixture containing a positive electrode active material (electrode active material) and a conductive aid (conductive material) into a sheet shape, is arranged at a bottom center of the positive electrode case 2 constituting a positive electrode current collector. A separator 5 formed of a porous sheet or film such as microporous membrane, woven fabric or nonwoven fabric is laminated on the positive electrode 4, and a negative electrode 6 is laminated on the separator 5. As a material of the negative electrode 6, for example, a stainless steel foil or copper foil having a lithium metal foil overlaid thereon, and a copper foil having a lithium absorption material such as graphite or hard carbon applied thereto can be used. A negative electrode current collector 7 made of metal is laminated on the negative electrode 6, and a metallic spring 8 is placed on the negative electrode current collector 7. An electrolyte 9 is filled into an internal space, and the negative electrode case 3 is attached fixedly to the positive electrode case 2 against a biasing force of the metallic spring 8, and these cases are sealed with a gasket 10 interposed therebetween.

Next, an example of a method of manufacturing the secondary battery will be described in detail.

First, an electrode active material is formed into an electrode shape. For example, the electrode active material is mixed with a conductive aid and a binder, a solvent is then added to the resulting mixture to form a slurry, and the slurry is applied onto a positive electrode current collector by arbitrary coating method and dried to form a positive electrode.

Herein, the conductive aid is not particularly limited, and for example, carbonaceous fine particles such as graphite, carbon black, and acetylene black; carbon fibers such as vapor-grown carbon fibers, carbon nanotubes, and carbon nanohorns; and conductive polymers such as polyaniline, polypyrrole, polythiophene, polyacetylene, and polyacene can be used. Further, two or more kinds of the conductive aids can be mixed for use. In addition, the content of the conductive aid in the positive electrode 4 is preferably 10 to 80% by mass.

Also, the binder is not particularly limited, and various resins such as polyethylene, polyvinylidene fluoride, polyhexafluoropropylene, polytetrafluoroethylene, polyethylene oxide, and carboxymethyl cellulose can be used.

Moreover, the solvent is not particularly limited, and for example, basic solvents such as dimethylsulfoxide, dimethylformamide, 1-methyl-2-pyrrolidone, propylene carbonate, diethyl carbonate, dimethyl carbonate, and γ-butyrolactone; non-aqueous solvents such as acetonitrile, tetrahydrofuran, nitrobenzene, and acetone; protic solvents such as methanol and ethanol; and water can be used.

A kind of the solvents, a mixing ratio of the organic compound and the solvent, and a kind and addition amount of an additive, and the like can be arbitrarily set in consideration of required characteristics of the secondary battery, productivity and the like.

Then, the positive electrode 4 is impregnated with the electrolyte 9 to allow the electrolyte 9 to penetrate into the positive electrode 4, and thereafter, the positive electrode 4 is placed at a bottom center of the positive electrode case 2 constituting the positive electrode current collector. Then, the separator 5 impregnated with the electrolyte 9 is laminated on the positive electrode 4, and the negative electrode 6 and the negative electrode current collector 7 are laminated in turn, and thereafter, the electrolyte 9 is injected into an internal space. Then, the metallic spring 8 is placed on the negative electrode current collector 7, and the gasket 10 is arranged at a periphery, and the negative electrode case 3 is attached fixedly to the positive electrode case 2, and these cases are externally sealed with a caulking machine to prepare a coin type secondary battery.

The electrolyte 9 is interposed between the positive electrode 4 and the negative electrode 6, an opposed electrode of the positive electrode 4, to perform charge carrier transport between both electrodes, and as such an electrolyte 9, a material having an ion conductivity of $10^{-5}$ to $10^{-1}$ S/cm at room temperature can be used, and for example, an electrolytic solution obtained by dissolving an electrolyte salt in an organic solvent can be used.

As the electrolyte salt, for example, $LiPF_6$, $LiClO_4$, $LiBF_4$, $LiCF_3SO_3$, $LiN(CF_3SO_2)_2$, $LiN(C_2F_5SO_2)_2$, $LiC(CF_3SO_2)_3$, $LiC(C_2F_5SO_2)_3$ and the like can be used.

As the organic solvent, ethylene carbonate, propylene carbonate, dimethyl carbonate, diethyl carbonate, methylethyl carbonate, γ-butyrolactone, tetrahydrofuran, dioxolane, sulfolane, dimethylformamide, dimethylacetamide, 1-methyl-2-pyrrolidone and the like can be used.

A solid electrolyte, an ionic liquid formed by combining cations with anions, symmetric glycol diether such as glymes, chain sulfones and the like may be used for the electrolyte 9.

Examples of a polymer compound used for the solid electrolyte may include vinylidene fluoride-based polymers such as polyvinylidene fluoride, vinylidene fluoride-hexafluoropropylene copolymer, vinylidene fluoride-ethylene copolymer, vinylidene fluoride-monofluoroethylene copolymer, vinylidene fluoride-trifluoroethylene copolymer, vinylidene fluoride-tetrafluoroethylene copolymer, and vinylidene fluoride-hexafluoropropylene-tetrafluoroethylene terpolymer; acrylonitrile-based polymers such as acrylonitrile-methyl methacrylate copolymer, acrylonitrile-methyl acrylate copolymer, acrylonitrile-ethyl methacrylate copolymer, acrylonitrile-ethyl acrylate copolymer, acrylonitrile-methacrylic acid copolymer, acrylonitrile-acrylic acid copolymer, and acrylonitrile-vinyl acetate copolymer; polyethylene oxide, ethylene oxide-propylene oxide copolymer, and polymers such as acrylate and methacrylate thereof, and the like. Also, gelated mixtures of these polymer compounds and an electrolytic solution may be used as the electrolyte 9, or only a polymer compound containing an electrolyte salt can be used as it is for the electrolyte 9.

As the cations in the ionic liquid, imidazolium such as 2-ethylimidazolium, 3-propylimidazolium, 1-ethyl-3-methylimidazolium, 1-butyl-3-methylimidazolium, and 1,3-dimethylimidazolium; ammonium such as diethylmethyl ammonium, tetrabutyl ammonium, cyclohexyl trimethyl ammonium, methyltri-n-octylammonium, triethyl(2-methoxyethoxymethyl)ammonium, benzyl dimethyl tetradecyl ammonium, and benzyl trimethyl ammonium; and others such as alkylpyridinium, dialkyl pyrrolidinium, tetraalkylphosphonium, and trialkylsulfonium can be used. As the anions in the ionic liquid, halide anions such as $Cl^-$, $Br^-$, and $I^-$; boride anions such as $BF_4^-$, $B(CN)_4^-$, and $B(C_2O_4)_2^-$; amide anions or imide anions such as $(CN)_2N^-$, $[N(CF_3)_2]^-$, and $[N(SO_2CF_3)_2]^-$; sulfate anions or sulfonate anions such as $RSO_3^-$ (R indicates an aliphatic hydrocarbon group or an aromatic hydrocarbon group. The same shall apply hereafter), $RSO_4^-$, $R^fSO_3^-$ ($R^f$ indicates a fluorine-containing halogenated hydrocarbon group. The same shall apply hereafter), and $R^fSO_4^-$; phosphate anions such as $R^f_2P(O)O^-$, $PF_6^-$, and $R^f_3PF_3^-$; antimonate anions such as $SbF_6^-$; and others such as lactate, nitrate ion, and trifluoroacetate can be used.

As the glymes, methyltriglyme, ethyltriglyme, butyltriglyme, methyltetraglyme, ethyltetraglyme, butyltetraglyme and the like can be used.

As the chain sulfones, 2-(ethylsulfonyl)propane, 2-(ethylsulfonyl)butane and the like can be used.

As described above, since the electrode of the present invention contains the electrode active material and the conductive material described above, it has high charge-discharge efficiency and can be charged in a short time, and an increase in output can be realized.

Further, while the electrode active material of the secondary battery has a varying structure and state depending on a charge state, a discharge state or an intermediate state thereof since the electrode active material is reversibly oxidized or reduced by charging and discharging, in the present embodiment, the electrode active material is contained in any one of a reaction starting material (a substance initiating a chemical reaction in an electrode reaction in the battery), a reaction product (a substance produced as a result of a chemical reaction), and an intermediate product in at least a discharge reaction. As a result, it becomes possible to attain a long-life secondary battery which has high energy density, can be charged quickly and discharged at high output, has good cycle characteristics whereby there is small deterioration in capacity even in repeating charge and discharge, and has stable battery characteristics.

In the present embodiment, since the secondary battery is configured by using the electrode active material, a secondary battery having high energy density and excellent stability can be obtained.

Furthermore, the electrode active material has the organic compound as the main component, and therefore it is possible to attain a secondary battery in which an environmental burden is low and its safety is taken into consideration.

Besides, the present invention is not limited to the above-mentioned embodiments, and various variations may be made without departing from the gist of the invention. For example, with respect to the organic compound predominantly constituting the electrode active material, each of the chemical formulas (1a)-(1r) listed above is just an example of the chemical formulas of the organic compound, and the chemical formulas are not limited to these formulas. That is, when the organic compound is an organic compound containing a rubeanic acid structure indicated by the general formula (1) in the structural unit, an electrode reaction similar to the above-mentioned chemical reaction formula (A) proceeds in the battery, and therefore it becomes possible to attain a desired secondary battery having high energy density and excellent cycle characteristics, in which the stability of a charge-discharge reaction is improved, by containing cyanomethanesulfonylamide in the electrode active material in addition to the organic compound.

In the above-embodiment, the coin type secondary battery has been described, but it is needless to say that a shape of the battery is not particularly limited, and the present invention can also be applied to a cylindrical battery, a prismatic battery, a sheet-shaped battery, and the like. Also, a casing method is not also particularly limited, and a metal case, a molded resin, an aluminum laminate film or the like may be used.

In the above-embodiment, the electrode active material is used for the positive electrode active material, and further the electrode active material is effectively used for the negative electrode active material.

Next, Examples of the present invention will be specifically described.

In addition, each of Examples shown below is just an example, and the present invention is not limited to Examples below.

EXAMPLES

Example 1

Preparation of Secondary Battery

A rubeanic acid indicated by the chemical formula (1a) was prepared.

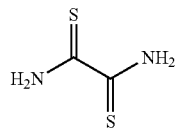

(1a)

Then, 100 mg of the rubeanic acid and 0.2 mg of cyanomethanesulfonylamide were mixed to prepare a mixture for an active material (the content of the cyanomethanesulfonylamide: 0.2% by mass).

Subsequently, 800 mg of graphite powder as a conductive aid, and 200 mg of polytetrafluoroethylene as a binder were respectively weighed, and these weighed materials and the above-mentioned mixture (100.2 mg) for an active material were kneaded while being uniformly mixed, and thereafter the resulting mixture was pressure-formed to obtain a sheet-like member having a thickness of about 150 μm. Thereafter, the sheet-like member was dried at 70° C. for 1 hour in vacuum, and then punched out into a round shape with a diameter of 12 mm to prepare a positive electrode containing the mixture for an active material. Next, the positive electrode was impregnated with an electrolytic solution to allow the electrolytic solution to penetrate into cavities in the positive electrode. Herein, as the electrolytic solution, a mixed solution containing methyltetraglyme (electrolyte) and $LiN(CF_3SO_2)_2$ (electrolyte salt) in an equimolar amount was used.

Next, the positive electrode was placed on a positive electrode current collector, and further a separator having a thickness of 20 μm, which was made of a polypropylene porous film impregnated with the electrolytic solution, was laminated on the positive electrode, and further a negative electrode obtained by attaching lithium to both surfaces of a stainless steel current collector was laminated on the separator. Then, a metallic spring was placed on the current collector, and a negative electrode case was joined to a positive electrode case with a gasket arranged at a periphery, and these cases were externally sealed with a caulking machine to prepare a hermetically sealed coin type battery having the mixture for an active material as a positive electrode active material and metal lithium as a negative electrode active material.

Check of Operation of Secondary Battery

The coin type battery thus prepared was charged at a constant current of 0.1 mA until a voltage reached 4.2 V, and thereafter, was discharged at a constant current of 0.1 mA until a voltage reached 1.5 V. Consequently, the battery was verified to be a secondary battery having a discharge capacity of 0.33 mAh, which had a plateau at a charge-discharge voltage of 2.1 V.

A capacity density per mass of the active material, calculated from the discharge capacity, was 440 Ah/kg, and this compound was verified to be an electrode active material with high capacity density which is suitable for a high energy density battery.

Thereafter, a cycle of charge and discharge was repeated 100 times in a range of 1.5 to 4.2 V. Consequently, the discharge capacity even after 100 cycles repeated was 0.32 mAh (97% of the initial capacity of 0.33 mAh), and therefore the secondary battery was found to be excellent in stability.

Example 2

Preparation of Secondary Battery

A coin battery was prepared in the same manner as in Example 1 except for using, as the electrolytic solution, which used an ionic liquid including 1-ethyl-3-methylimidazolium bis(trifluorosulfonyl)imide as an electrolyte and contains $LiN(CF_3SO_2)_2$ (electrolyte salt) having a mole concentration of 1M, in place of the mixed solution of methyltetraglyme and $LiN(CF_3SO_2)_2$.

Check of Operation of Secondary Battery

The above-mentioned coin battery was charged at a constant current of 0.1 mA until a voltage reached 4.2 V, and thereafter, was discharged at a constant current of 0.1 mA until a voltage reached 1.5 V. Consequently, the battery was verified to be a secondary battery having a discharge capacity of 0.48 mAh, which had a plateau at a charge-discharge voltage of 2.1 V.

A capacity density per mass of the active material, calculated from the discharge capacity, was 640 Ah/kg, and the compound was verified to be an electrode active material with high capacity density which is suitable for a high energy density battery.

Thereafter, a cycle of charge and discharge was repeated 100 times in a range of 1.5 to 4.2 V. Consequently, the discharge capacity even after 100 cycles repeated was 80% or more of the initial capacity, and therefore the secondary battery was verified to be excellent in stability.

Example 3

Preparation of Secondary Battery

N,N'-Dimethyl dithiooxamide indicated by the chemical formula (1b) was prepared.

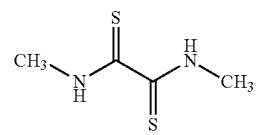

(1b)

A coin battery was prepared in the same manner as in Example 1 except for using N,N'-dimethyl dithiooxamide in place of the rubeanic acid in Example 1.

Check of Operation of Secondary Battery

The above-mentioned coin battery was charged at a constant current of 0.1 mA until a voltage reached 4.2 V, and thereafter, was discharged at a constant current of 0.1 mA until a voltage reached 1.5 V. Consequently, the battery was verified to be a secondary battery having a discharge capacity of 0.31 mAh, which had a plateau at a charge-discharge voltage of 2.2 V.

A capacity density per mass of the active material, calculated from the discharge capacity, was 400 Ah/kg, and the compound was verified to be an electrode active material with high capacity density which is suitable for a high energy density battery.

Thereafter, a cycle of charge and discharge was repeated 100 times in a range of 1.5 to 4.2 V. Consequently, the discharge capacity even after 100 cycles repeated was 80% or more of the initial capacity, and therefore the secondary battery was verified to be excellent in stability.

Example 4

Preparation of Secondary Battery

N,N'-(2-Hydroxyethyl)dithiooxamide indicated by the chemical formula (1m) was prepared.

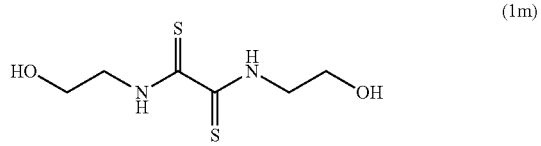 [SMILES: OCCNC(=S)C(=S)NCCO]

(1m)

A coin battery was prepared in the same manner as in Example 1 except for using N,N'-(2-hydroxyethyl)dithiooxamide in place of the rubeanic acid in Example 1.

Check of Operation of Secondary Battery

The above-mentioned coin battery was charged at a constant current of 0.1 mA until a voltage reached 4.2 V, and thereafter, was discharged at a constant current of 0.1 mA until a voltage reached 1.5 V. Consequently, the battery was verified to be a secondary battery having a discharge capacity of 0.24 mAh, which had a plateau at a charge-discharge voltage of 2.2 V.

A capacity density per mass of the active material, calculated from the discharge capacity, was 290 Ah/kg, and this compound was verified to be an electrode active material with high capacity density which is suitable for a high energy density battery.

Thereafter, a cycle of charge and discharge was repeated 100 times in a range of 1.5 to 4.2 V. Consequently, the discharge capacity even after 100 cycles repeated was 80% or more of the initial capacity, and therefore the secondary battery was verified to be excellent in stability.

Example 5

Preparation of Secondary Battery (2-Piperidinyl)-2-thioxoethanethioamide indicated by the chemical formula (1p) was prepared.

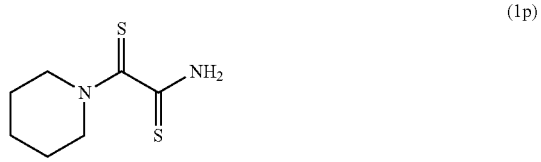 [SMILES: NC(=S)C(=S)N1CCCCC1]

(1p)

A coin battery was prepared in the same manner as in Example 1 except for using (2-piperidinyl)-2-thioxoethanethioamide in place of the rubeanic acid in Example 1.

Check of Operation of Secondary Battery

The above-mentioned coin battery was charged at a constant current of 0.1 mA until a voltage reached 4.2 V, and thereafter, was discharged at a constant current of 0.1 mA until a voltage reached 1.5 V. Consequently, the battery was verified to be a secondary battery having a discharge capacity of 0.28 mAh, which had a plateau at a charge-discharge voltage of 2.2 V.

A capacity density per mass of the active material, calculated from the discharge capacity, was 320 Ah/kg, and this compound was verified to be an electrode active material with high capacity density which is suitable for a high energy density battery.

Thereafter, a cycle of charge and discharge was repeated 100 times in a range of 1.5 to 4.2 V. Consequently, the discharge capacity even after 100 cycles repeated was 80% or more of the initial capacity, and therefore the secondary battery was verified to be excellent in stability.

Comparative Example

Preparation of Secondary Battery

A coin battery was prepared in the same manner as in Example 1 except for forming a positive electrode active material by using the rubeanic acid alone without containing cyanomethanesulfonylamide in Example 1.

Check of Operation of Secondary Battery

The above-mentioned coin battery was charged at a constant current of 0.1 mA until a voltage reached 4.2 V, and thereafter, was discharged at a constant current of 0.1 mA until a voltage reached 1.5 V. Consequently, the battery was verified to be a secondary battery having a discharge capacity of 0.33 mAh, which had a plateau at a charge-discharge voltage of 2.1 V.

A capacity density per mass of the active material, calculated from the discharge capacity, was 440 Ah/kg, and the compound was verified to be an electrode active material with high capacity density which is suitable for a high energy density battery.

However, when thereafter a cycle of charge and discharge was repeated 100 times in a range of 1.5 to 4.2 V, the discharge capacity after 100 cycles repeated was less than 80% of the initial capacity, and therefore the secondary battery was found to be inferior in stability to the secondary batteries of Examples 1 to 5.

A secondary battery which has high energy density and high output, and has excellent cycle characteristics excellent in stability whereby there is small deterioration in capacity even after repeated charge-discharge reaction can be realized.

DESCRIPTION OF REFERENCE SYMBOLS

4 Positive electrode
6 Negative electrode
9 Electrolyte

The invention claimed is:

1. An electrode active material for a secondary battery, the electrode active material comprising, as the main component thereof, a mixture of an organic compound containing a rubeanic acid structure and cyanomethanesulfonylamide.

2. The electrode active material according to claim 1, wherein the organic compound is represented by:

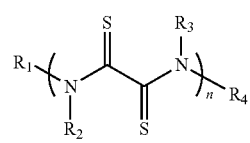

wherein n is an integer between 1 and 20, and $R_1$-$R_4$ are at least any one selected from the group consisting of a hydrogen atom, a halogen atom, a hydroxyl group, a substituted or unsubstituted alkyl group having 1 to 3 carbon atoms, a substituted or unsubstituted amino group, a substituted or unsubstituted phenyl group, a substituted or unsubstituted cyclohexyl group and a substituted or unsubstituted sulfo group.

3. The electrode active material according to claim 2, wherein $R_1$-$R_4$ are the same.

4. The electrode active material according to claim 3, wherein $R_1$-$R_4$ are linked together to form a saturated or unsaturated ring.

5. The electrode active material according to claim 2, wherein $R_1$-$R_4$ are linked together to form a saturated or unsaturated ring.

6. The electrode active material according to claim 1, wherein a content of the cyanomethanesulfonylamide in the mixture is 0.1% by mass or more.

7. The electrode active material according to claim 6, wherein a content of the cyanomethanesulfonylamide in the mixture is 10% by mass or less.

8. The electrode active material according to claim 1, wherein the organic compound is selected from the group consisting of:

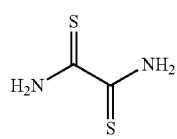
(1a)

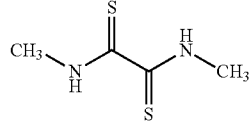
(1b)

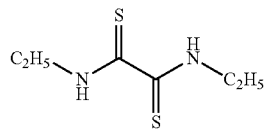
(1c)

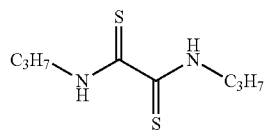
(1d)

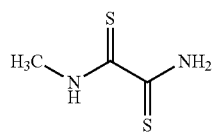
(1e)

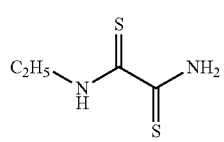
(1f)

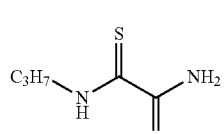
(1g)

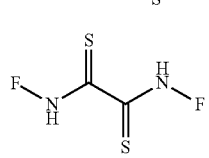
(1h)

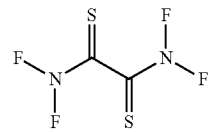
(1i)

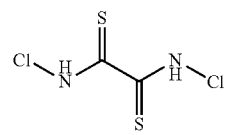
(1j)

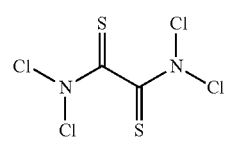
(1k)

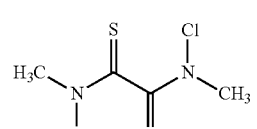
(1l)

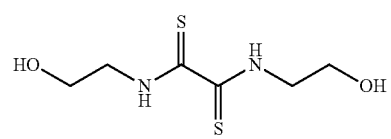
(1m)

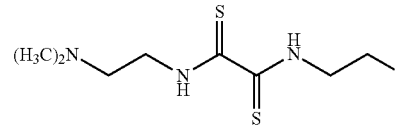
(1n)

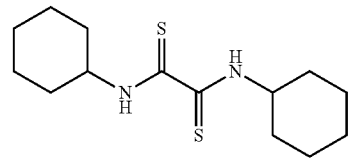
(1o)

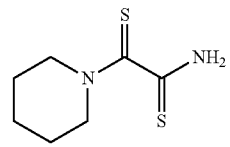
(1p)

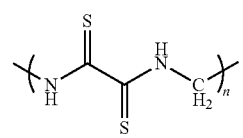
(1q)

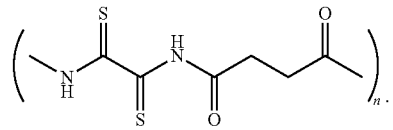
(1r)

9. An electrode comprising:
the electrode active material according to claim 1; and
a conductive material.

10. The electrode according to claim 9, wherein the organic compound is represented by:

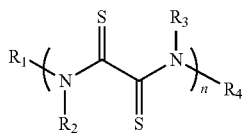

wherein n is an integer between 1 and 20, and $R_1$-$R_4$ are at least any one selected from the group consisting of a hydrogen atom, a halogen atom, a hydroxyl group, a substituted or unsubstituted alkyl group having 1 to 3 carbon atoms, a substituted or unsubstituted amino group, a substituted or unsubstituted phenyl group, a substituted or unsubstituted cyclohexyl group and a substituted or unsubstituted sulfo group.

11. The electrode according to claim 10, wherein $R_1$-$R_4$ are the same.

12. The electrode according to claim 11, wherein $R_1$-$R_4$ are linked together to form a saturated or unsaturated ring.

13. The electrode according to claim 10, wherein $R_1$-$R_4$ are linked together to form a saturated or unsaturated ring.

14. The electrode according to claim 9, wherein a content of the cyanomethanesulfonylamide in the mixture is 0.1% by mass or more.

15. The electrode according to claim 14, wherein a content of the cyanomethanesulfonylamide in the mixture is 10% by mass or less.

16. A secondary battery, wherein the electrode active material according to claim 1 is contained in any one of a reaction starting material, a reaction product and an intermediate product in at least a discharge reaction of an electrode reaction in the battery.

17. A secondary battery comprising:
a positive electrode;
a negative electrode; and
an electrolyte,
wherein the positive electrode comprises the electrode active material according to claim 1.

18. The secondary battery according to claim 17, wherein the organic compound is represented by:

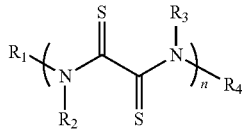

wherein n is an integer between 1 and 20, and $R_1$-$R_4$ are at least any one selected from the group consisting of a hydrogen atom, a halogen atom, a hydroxyl group, a substituted or unsubstituted alkyl group having 1 to 3 carbon atoms, a substituted or unsubstituted amino group, a substituted or unsubstituted phenyl group, a substituted or unsubstituted cyclohexyl group and a substituted or unsubstituted sulfo group.

19. The secondary battery according to claim 17, wherein the organic compound is selected from the group consisting of:

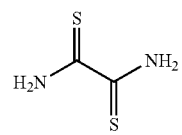
(1a)

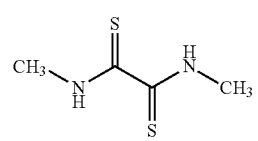
(1b)

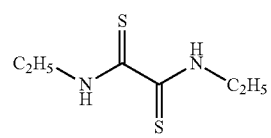
(1c)

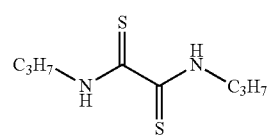
(1d)

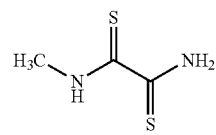
(1e)

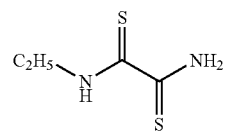
(1f)

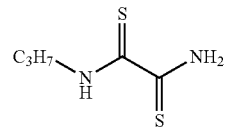
(1g)

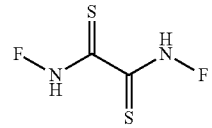
(1h)

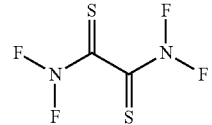
(1i)

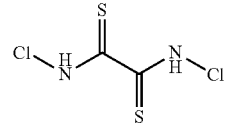
(1j)

-continued
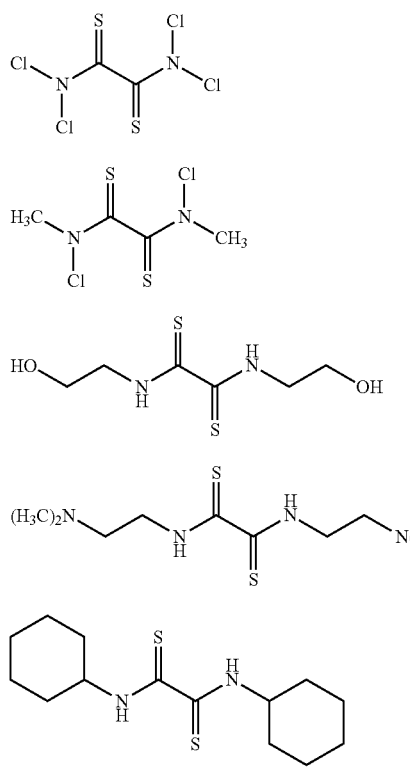
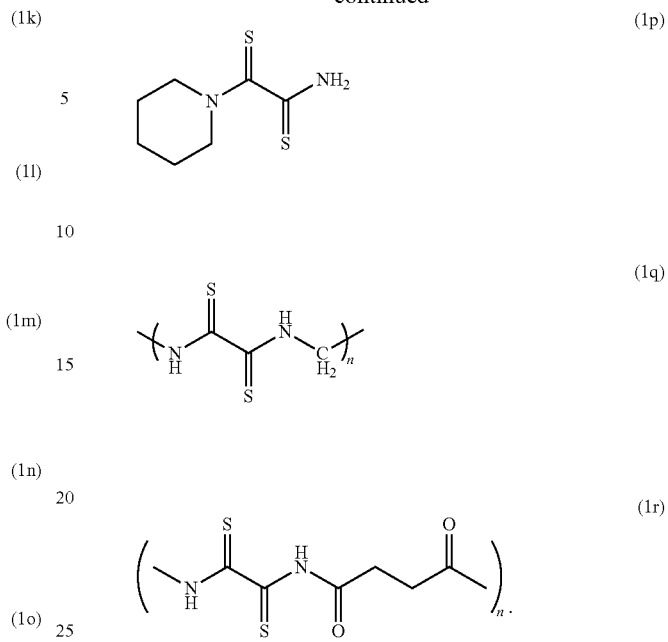
20. The secondary battery according to claim 17, wherein a content of the cyanomethanesulfonylamide in the mixture is 0.1% by mass or more and 10% by mass or less.
* * * * *